(12) United States Patent
Holland et al.

(10) Patent No.: US 7,891,457 B2
(45) Date of Patent: Feb. 22, 2011

(54) VEHICLE HAVING DUAL DEADMAN PEDALS AND METHOD OF OPERATION

(75) Inventors: Gregory Holland, Endicott, NY (US); David Howe, Binghamton, NY (US)

(73) Assignee: The Raymond Corporation, Greene, NY (US)

( * ) Notice: Subject to any disclaimer, the term of this patent is extended or adjusted under 35 U.S.C. 154(b) by 155 days.

(21) Appl. No.: 12/405,533

(22) Filed: Mar. 17, 2009

(65) Prior Publication Data

US 2009/0272595 A1 Nov. 5, 2009

Related U.S. Application Data

(60) Provisional application No. 61/050,357, filed on May 5, 2008.

(51) Int. Cl.
*B60K 28/04* (2006.01)

(52) U.S. Cl. .................. 180/273; 180/271; 180/272; 180/287; 180/315

(58) Field of Classification Search ............... 180/271, 180/272, 273, 287, 315
See application file for complete search history.

(56) References Cited

U.S. PATENT DOCUMENTS

| | | | | |
|---|---|---|---|---|
| 4,230,200 A | * | 10/1980 | Carolan | 180/272 |
| 4,716,980 A | | 1/1988 | Butler | |
| 5,044,472 A | | 9/1991 | Dammeyer et al. | |
| 5,115,179 A | * | 5/1992 | Fujii et al. | 318/568.13 |
| 5,340,202 A | | 8/1994 | Day | |
| 5,904,165 A | * | 5/1999 | McLean et al. | 134/172 |
| 5,915,673 A | * | 6/1999 | Kazerooni | 254/270 |
| 6,182,778 B1 | | 2/2001 | Henshaw et al. | |
| 6,189,964 B1 | | 2/2001 | Henshaw et al. | |
| 7,121,608 B2 | * | 10/2006 | Billger et al. | 296/65.06 |
| 7,154,197 B2 | * | 12/2006 | Suita et al. | 307/326 |
| 7,347,299 B2 | * | 3/2008 | Billger et al. | 180/326 |
| 2003/0018411 A1 | * | 1/2003 | Suita et al. | 700/245 |
| 2007/0074923 A1 | * | 4/2007 | Billger et al. | 180/330 |
| 2008/0041652 A1 | * | 2/2008 | Kamiki | 180/272 |
| 2009/0090577 A1 | * | 4/2009 | Takahashi et al. | 180/272 |
| 2009/0211831 A1 | * | 8/2009 | Takamatsu | 180/272 |

FOREIGN PATENT DOCUMENTS

| | | |
|---|---|---|
| EP | 1 505 035 A | 2/2005 |
| WO | 2005/118457 A | 12/2005 |

OTHER PUBLICATIONS

European Search Report date Jul. 1, 2009.

* cited by examiner

*Primary Examiner*—Paul N. Dickson
*Assistant Examiner*—Barry Gooden, Jr.
(74) *Attorney, Agent, or Firm*—Quarles & Brady LLP

(57) ABSTRACT

A material handling vehicle includes an operator compartment having a floor. A step is disposed in the operator compartment and spaced above the floor. A first deadman switch is disposed in the floor for actuation by an operator standing on the floor in the operator compartment. A second deadman switch is disposed in the step for actuation by an operator sitting in the operator compartment, wherein simultaneous actuation of the first deadman switch and the second deadman switch disables operation of both deadman switches.

14 Claims, 1 Drawing Sheet

VEHICLE HAVING DUAL DEADMAN PEDALS AND METHOD OF OPERATION

CROSS REFERENCES TO RELATED APPLICATIONS

This application claims the priority benefit of U.S. Provisional Patent Application No. 61/050,357 filed on May 5, 2008.

STATEMENT REGARDING FEDERALLY SPONSORED RESEARCH

Not Applicable.

BACKGROUND OF THE INVENTION

The present invention relates to material handling vehicles, and more particularly to a material handling vehicle having two deadman pedals.

Material handling vehicles, such as lift trucks, are typically configured to be operated by an operator that either sits while operating the truck or stands while operating the truck. The choice of how the operator operates the vehicle, i.e. sitting or standing, is made by the engineers specifying the vehicle and is not a choice made by the operator upon mounting the vehicle for operation.

Designing a vehicle configurable for use by an operator in either a sitting position or a standing position is made difficult by the necessity to provide operator controls that are accessible and operable in by an operator sitting or standing. Dual controls, i.e. a first set of controls for use by a sitting operator and a second set of controls for use by a standing operator, can be provided for use in a vehicle that allows an operator to either sit or stand during operation. Simultaneous operation of these controls, however, can result in conflicting signals to a vehicle control system that can lead to unexpected results. Accordingly, a need exists for a method of operating dual controls that cannot be misinterpreted by a vehicle control system.

SUMMARY OF THE INVENTION

The present invention provides a material handling vehicle including an operator compartment having a floor. A step is disposed in the operator compartment and spaced above the floor. A first deadman switch is disposed in the floor for actuation by an operator standing on the floor in the operator compartment. A second deadman switch is disposed in the step for actuation by an operator sitting in the operator compartment, wherein simultaneous actuation of the first deadman switch and the second deadman switch disables operation of both deadman switches to disable movement of the vehicle.

A general objective of the present invention is to provide a material handing vehicle and method of operating the vehicle with two deadman switches. This objective is accomplished by providing a vehicle and method of operation in which simultaneous actuation of the first deadman switch and the second deadman switch disables operation of both deadman switches.

These and still other objectives and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

DETAILED DESCRIPTION OF PREFERRED EMBODIMENTS

Figure 1:
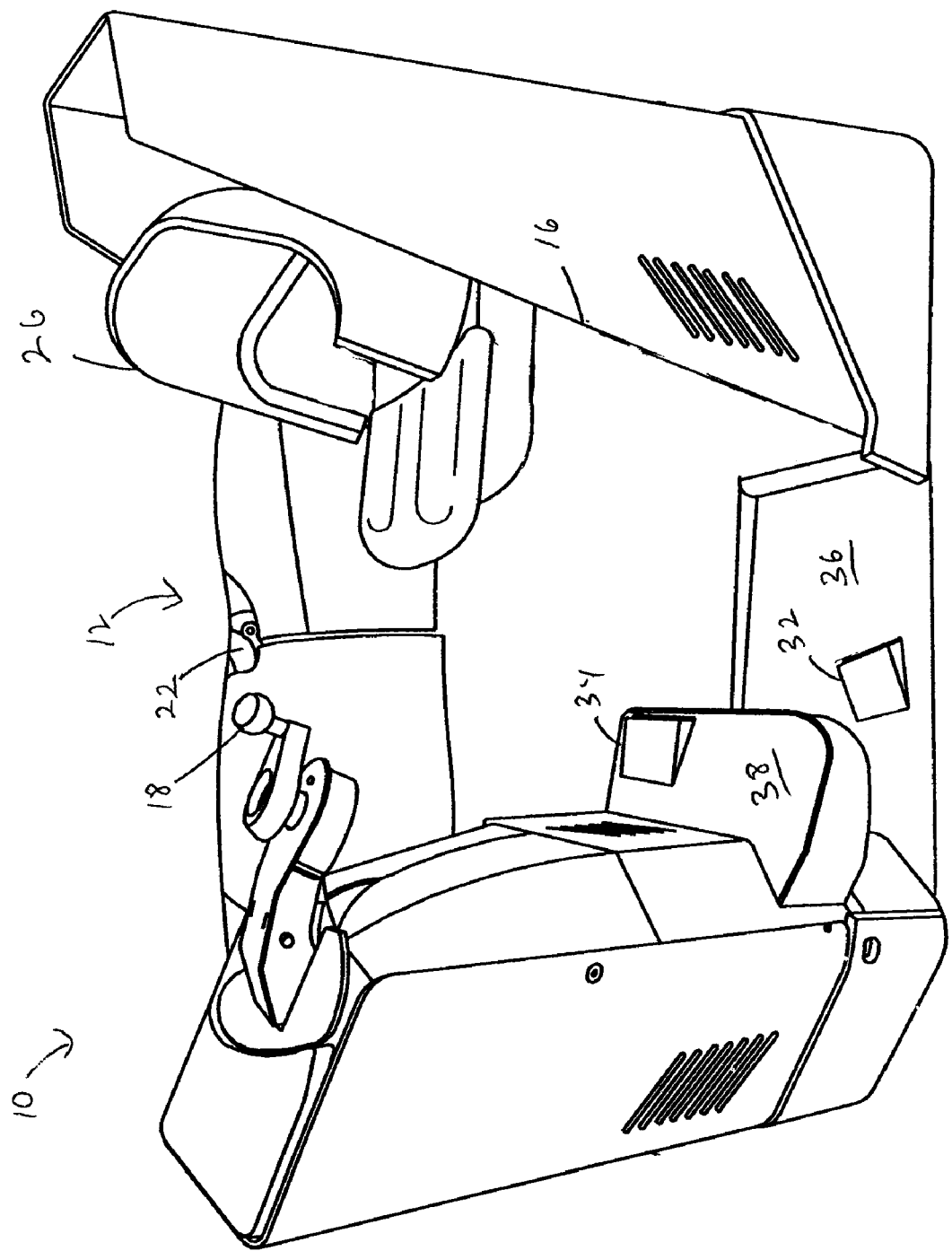
FIG. 1 is a perspective view of a lift truck operator compartment.

Referring now to FIG. 1, a material handling vehicle or lift truck 10 constructed in accordance with the present invention is shown. The material handling vehicle 10 includes an operator compartment 12 with an opening 16 for entry and exit of the operator. A steering wheel 18 and control handle 22 are also provided in the compartment 12. The control handle 22 is mounted to the front of the operator compartment 12 proximate forks (not shown) extending away from the front of the operator compartment. A seat 26 is provided in the compartment 12 adjacent the control handle 22 for use by the operator when operating the truck in a seated position. The seat 26 can be folded out of the way allowing the operator to operate the vehicle 10 in a standing position. Although the material handling vehicle 10 as shown by way of example as a standing or sitting, fore-aft stance operator configuration lift truck, it will be apparent to those of skill in the art that the present invention is not limited to vehicles of this type, and can also be provided in various other types of material handling and lift truck configurations.

Two deadman switches 32, 34, or pedals, are provided in the compartment 12, only one of which may be actuated in order to operate the truck 10. The first deadman switch 32 is positioned on a floor 36 of the compartment 12 for use by the operator when operating the truck 10 in a standing position. The second deadman switch 34 is positioned on a step 38 raised above the floor 36 for use by the operator when operating the truck 10 in a sitting position on the seat 26. Each deadman switch 32, 34 provides a signal to a truck control system upon actuation of the switch 32, 34 by the operator.

Importantly, simultaneous operation of these deadman switches 32, 34 is avoided by interpreting the signals, or lack thereof, provided to the control system by the switches 32, 34. The signals are interpreted differently depending upon the state of operation of the vehicle 10, as discussed below.

In a first state of operation, the vehicle control system performs a self-test when an operator attempts to start the vehicle 10. If neither deadman switch 32, 34 is actuated, i.e. the vehicle control system does not receive a signal indicating that one of deadman switches 32, 34 is actuated during the first state of operation, the vehicle 10 is allowed to start. If only one of the deadman switches 32 or 34 is actuated during the first state of operation, the vehicle control system receives a signal from the actuated deadman switch 32, 34 indicating one of the deadman switches 32, 34 is activated and the vehicle control system does not allow the vehicle 10 to start. Preferably, if the vehicle 10 is not allowed to start because the vehicle control system receives a signal indicating one of the deadman switches 32, 34 is activated during the first state of operation, the operator is advised, such as by an audible or visual signal controlled by the vehicle control system, to cease actuating the actuated deadman switch 32, 34, such as by stepping off the actuated deadman switch 32, 34. If both deadman switches 32, 34 are actuated, i.e. the vehicle control system receives signals indicating that both deadman switches 32, 34 are actuated, during the first state of operation, the vehicle control system does not allow the vehicle 10 to start. Preferably, if both deadman switches 32, 34 are actuated during the first state of operation, the operator is advised, such as by an audible or visual signal, to cease actuating both actuated deadman switches 32, 34, such as by stepping off of both deadman switches 32, 34.

In a second state of operation after the vehicle 10 is started in accordance with the operation of the vehicle in the first state of operation, and upon receiving a control signal from the control handle 22 to move the vehicle 10, but prior to beginning or resuming travel, the vehicle control system determines the actuation status of the deadman switches 32, 34. If neither deadman switch 32, 34 is actuated during the second state of operation, the vehicle control system does not allow the vehicle 10 to begin travel and a deadman brake inhibiting travel remains engaged. A signal, such as by an audible or visual signal controlled by the vehicle control system, can be provided to the operator advising the operator to actuate one of the deadman switches 32, 34 to begin travel. If only one of the deadman switches 32 or 34 is actuated during the second state of operation, the deadman brake is released and the vehicle control system allows the vehicle 10 to begin normal travel in accordance with signals from the control handle 22. If both deadman switches 32, 34 are actuated during the second state of operation, the deadman brake remains engaged and the vehicle control system does not allow the vehicle 10 to begin travel, as if neither of the deadman switches 32, 34 are actuated. A signal, such as by an audible or visual signal controlled by the vehicle control system, can be provided to the operator to reset the deadman switches 32, 34 by releasing the control handle 22 and actuating only one deadman switch 32 or 34 prior to operating the control handle 22 again.

In a third state of operation, in which the vehicle 10 is moving, i.e. during travel, the vehicle control system monitors the actuation status of the deadman switches 32, 34. If neither deadman switch 32, 34 is actuated while in the third state of operation, preferably, the deadman brake is engaged to bring the vehicle 10 to a controlled stop. If only one of the deadman switches 32 or 34 is actuated while in the third state of operation, the vehicle 10 is allowed to maintain normal travel in accordance with signals from the control handle 22. If both deadman switches 32, 34 are actuated while in the third state of operation, both deadman switches 32, 34 are disabled, i.e. the vehicle control system functions as if neither deadman switch is actuated, and the deadman brake is engaged to bring the vehicle to a controlled stop. Preferably, if both deadman switches 32, 34 are actuated or neither deadman switches 32, 34 are actuated in the third state of operation, the material handling vehicle 10 will respond to more aggressive deceleration inputs, such as via the control handle 22, to stop the vehicle 10 quicker than if the deceleration inputs were not received by the control system.

In a preferred embodiment, in the third state of operation one of the deadman switches 32 or 34 must have been actuated to enter the third state of operation, if during travel in the third state of operation, the deadman switch 32 or 34 that was actuated during a portion of the third state of operation is released, i.e. a signal is no longer received by the vehicle control system indicating that the deadman switch 32 or 34 is actuated, and the same deadman switch 32 or 34 is re-actuated while the vehicle 10 is traveling at a speed greater than 1 mph, the material handling vehicle 10 will resume travel in accordance with inputs from the control handle 22.

While there has been shown and described what are at present considered the preferred embodiments of the invention, it will be obvious to those skilled in the art that various changes and modifications can be made therein without departing from the scope of the invention defined by the appended claims.

We claim:

1. A material handling vehicle comprising:
   an operator compartment having a floor;
   a step disposed in said operator compartment and spaced above said floor;
   a first deadman switch disposed on said floor for actuation by an operator standing on said floor in said operator compartment; and
   a second deadman switch disposed on said step for actuation by an operator sitting in said operator compartment, wherein simultaneous actuation of said first deadman switch and said second deadman switch disables both said first deadman switch and said second deadman switch.

2. The material handling vehicle as in claim 1, in which upon disabling both of said first deadman switch and said second deadman switch when said vehicle is moving, said vehicle comes to a controlled stop.

3. The material handling vehicle as in claim 2, in which during said controlled stop, said vehicle responds to more aggressive deceleration inputs compared to said controlled stop.

4. The material handling vehicle as in claim 1, in which upon disabling said first deadman switch and said second deadman switch during an attempt to start said vehicle, a signal advises a user to step off of both of said first deadman switch and said second deadman switch.

5. The material handling vehicle as in claim 1, in which after said vehicle is started and prior to said vehicle moving, an input from a control handle directing said vehicle to move is received by said vehicle upon disablement of said first deadman switch and said second deadman switch, a signal advises a user to step off of both of said first deadman switch and said second deadman switch and release said control handle.

6. The material handling vehicle as in claim 1, in which actuation of only one of said first deadman switch and said second deadman switch enables movement of said vehicle.

7. The material handling vehicle as in claim 1, wherein when said vehicle is moving while only one of said first deadman switch and said second deadman switch is actuated, upon releasing said only one of said first deadman switch and said second deadman switch, said vehicle comes to a controlled stop.

8. The material handling vehicle as in claim 7, in which during said controlled stop, said vehicle responds to more aggressive deceleration inputs compared to said controlled stop.

9. A method of operating a material handling vehicle, said vehicle including an operator compartment having a floor and a step disposed in said operator compartment and spaced above said floor, said method comprising:
   enabling travel of said material handling vehicle by actuating one of a first deadman switch disposed on said floor and a second deadman switch disposed on said step; and
   disabling travel of said material handling vehicle by disabling said one of said first deadman switch and said second deadman switch by simultaneously actuating the other of said first deadman switch and said second deadman switch.

10. The method as in claim 9, including bringing said vehicle to a controlled stop upon disablement of said first deadman switch and said second deadman switch when said vehicle is moving.

11. The method as in claim 10, in which during said controlled stop, said vehicle responds to more aggressive deceleration inputs compared to said controlled stop.

12. The method as in claim 9, including advising a user to step off of both of said first deadman switch and said second deadman switch during an attempt to start said vehicle upon disablement of said first deadman switch and said second deadman switch.

13. The method as in claim 9, in which after said vehicle is started and prior to said vehicle moving, said method including advising a user to step off of both of said first deadman switch and said second deadman switch and release a control handle, when an input from the control handle directing said vehicle to move is received by said vehicle while said first deadman switch and said second deadman switch are disabled.

14. The method as in claim 9, including enabling movement of said vehicle upon actuation of only one of said first deadman switch and said second deadman switch.

* * * * *